United States Patent
Tsirkin et al.

(10) Patent No.: US 10,013,199 B2
(45) Date of Patent: Jul. 3, 2018

(54) TRANSLATION BYPASS BY HOST IOMMU FOR SYSTEMS WITH VIRTUAL IOMMU

(71) Applicant: Red Hat Israel, Ltd., Ra'anana (IL)

(72) Inventors: Michael Tsirkin, Westford, MA (US); Amnon Ilan, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 15/351,853

(22) Filed: Nov. 15, 2016

(65) Prior Publication Data
US 2018/0136868 A1 May 17, 2018

(51) Int. Cl.
*G06F 13/00* (2006.01)
*G06F 3/06* (2006.01)
*G06F 9/455* (2018.01)

(52) U.S. Cl.
CPC .......... *G06F 3/0637* (2013.01); *G06F 3/0622* (2013.01); *G06F 3/0664* (2013.01); *G06F 3/0673* (2013.01); *G06F 9/45545* (2013.01); *G06F 9/45558* (2013.01); *G06F 2009/45579* (2013.01); *G06F 2009/45583* (2013.01)

(58) Field of Classification Search
CPC ............... G06F 2212/151; G06F 9/455; G06F 9/45504; G06F 9/45508; G06F 9/45512; G06F 9/45516; G06F 9/4552; G06F 9/45525; G06F 9/45529; G06F 9/45533; G06F 9/45537; G06F 2009/45583
See application file for complete search history.

(56) References Cited

U.S. PATENT DOCUMENTS

| | | | |
|---|---|---|---|
| 7,613,898 B2 | 11/2009 | Haertel et al. |
| 8,086,765 B2 | 12/2011 | Turner et al. |
| 8,146,082 B2 | 3/2012 | Belay |
| 8,954,959 B2 | 2/2015 | Tsirkin et al. |
| 9,122,594 B2 | 9/2015 | Mahalingam et al. |
| 9,208,103 B2 | 12/2015 | Kessler et al. |
| 2012/0246381 A1 | 9/2012 | Kegel et al. |

(Continued)

OTHER PUBLICATIONS

Liu et al., Research on Hardware I/O Passthrough in Computer Virtualization, Proceedings of the Third International Symposium on Computer Science and Computational Technology, Jiaozuo, P.R. China, Aug. 14-15, 2010, pp. 353-356.

(Continued)

*Primary Examiner* — Sean D Rossiter
(74) *Attorney, Agent, or Firm* — K&L Gates LLP

(57) ABSTRACT

A system and method of translation bypass includes a hypervisor retrieving a physical bus address range from a host input-output memory management unit. The hypervisor reserves an allowed address range of the physical bus address range, and sends the allowed address range to a guest virtual machine. Sending the allowed address range sets a guest bus address range mapped by a virtual input-output memory management unit. The guest virtual machine is prevented from accessing any bus address outside of the allowed address range. The hypervisor receives, from the guest virtual machine, an access request to a guest bus address, which is an address within the allowed address range. The hypervisor stores the access request to the guest bus address in physical memory mapped in the host input-output memory management unit to an address outside of the allowed address range.

20 Claims, 6 Drawing Sheets

(56) References Cited

U.S. PATENT DOCUMENTS

| | | | |
|---|---|---|---|
| 2013/0132675 A1* | 5/2013 | Sleiman | G06F 12/0844 |
| | | | 711/122 |
| 2014/0068137 A1 | 3/2014 | Kegel et al. | |
| 2014/0189690 A1 | 7/2014 | Ramakrishnan Nair | |
| 2014/0258637 A1* | 9/2014 | Hong | G06F 12/0808 |
| | | | 711/135 |
| 2015/0163192 A1* | 6/2015 | Jain | H04L 61/103 |
| | | | 370/255 |
| 2016/0291996 A1* | 10/2016 | Tsirkin | G06F 9/45558 |
| 2016/0314085 A1* | 10/2016 | Ware | G06F 13/00 |
| 2017/0031838 A1* | 2/2017 | Mukherjee | G06F 12/1441 |
| 2017/0132147 A1* | 5/2017 | Loh | G06F 12/10 |
| 2017/0357579 A1* | 12/2017 | Tsirkin | G06F 12/0284 |
| 2018/0004678 A1* | 1/2018 | Bogusz | G06F 12/0215 |

OTHER PUBLICATIONS

Amit et al., vIOMMU: Efficient IOMMU Emulation, Technion & IBM Research, USENIX Annual Technical Conference 2011 (14 pages).

Ben-Yehuda, Muli, Bare-Metal Performance for x86 I/O Virtualization, Technion & IBM Research, Nov. 2011, Link: http://www.mulix.org/lectures/bare-metal-perf/bare-metal.pdf (23 pages).

\* cited by examiner

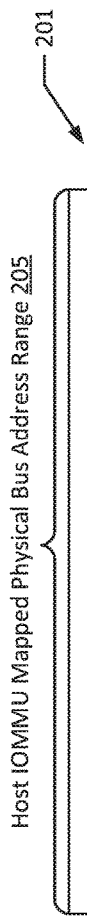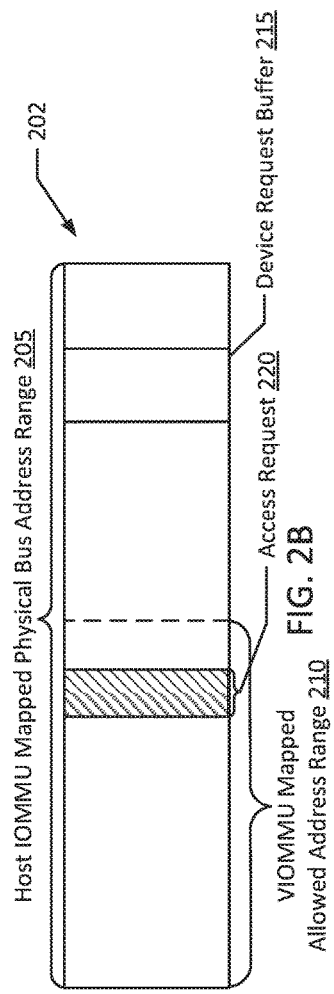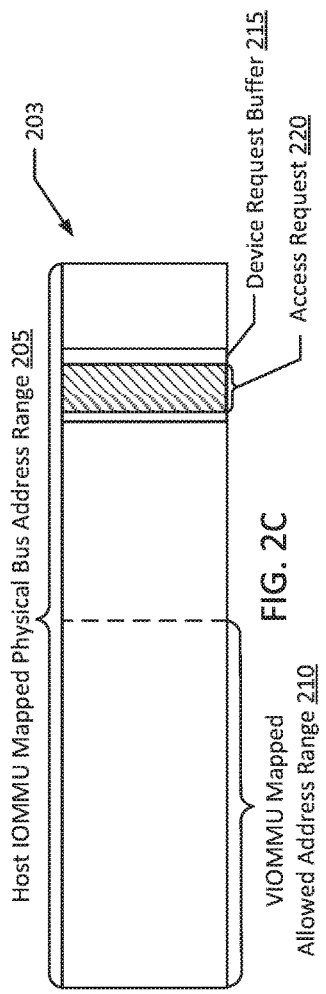

TRANSLATION BYPASS BY HOST IOMMU FOR SYSTEMS WITH VIRTUAL IOMMU

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative methods and systems for translation bypass. An example method includes executing, by a physical processor, a guest virtual machine with a guest memory and a virtual input-output memory management unit. The virtual input-output memory management unit maps a guest bus address range, which is a range of the guest memory. The method includes retrieving, by a hypervisor, a physical bus address range from a host input-output memory management unit. The physical bus address range is a range of a physical memory mapped by the host input-output memory management unit. The hypervisor reserves an allowed address range of the physical bus address range. The allowed address range is a strict subset of the physical bus address range. The hypervisor sends the allowed address range to the guest virtual machine, where sending the allowed address range sets the guest bus address range mapped by the virtual input-output memory management unit. The guest virtual machine is prevented from accessing any bus address outside of the allowed address range. The method includes receiving, by the hypervisor from the guest virtual machine, an access request to a guest bus address. The guest bus address is an address within the allowed address range. The hypervisor stores the access request to the guest bus address in physical memory mapped in the host input-output memory management unit to an address outside of the allowed address range.

Additional features and advantages of the disclosed methods and system are described in, and will be apparent from, the following Detailed Description and the Figures.

BRIEF DESCRIPTION OF THE FIGURES

FIGS. 2A-C are block diagrams illustrating an example of using a physical bus address range for translation bypass according to an example of the present disclosure.

DETAILED DESCRIPTION OF EXAMPLE EMBODIMENTS

Figure 1:
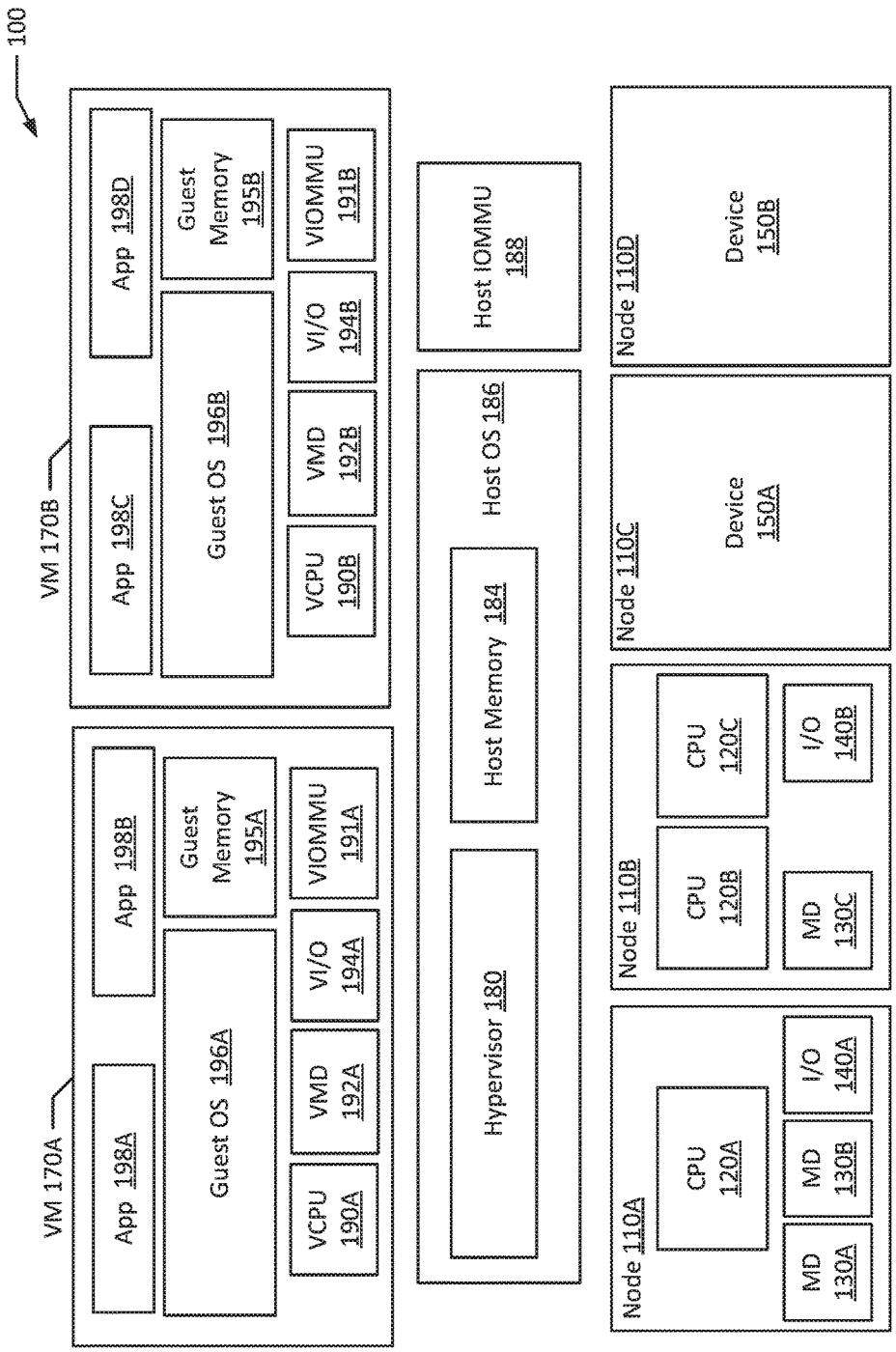
FIG. 1 is a block diagram of an example multi-processor computer system according to an example of the present disclosure.

In computer systems executing a guest virtual machine, a hypervisor may typically handle access requests between the guest virtual machine and a device. The access request is then typically executed on behalf of the guest virtual machine. For example, a request to transmit or receive packets of information may be executed on behalf of the guest virtual machine. In some situations, requests are in guest memory and are passed, by the guest virtual machine to the hypervisor, using a guest address (e.g., guest bus address). In other situations, requests are in guest memory but are mapped (e.g., as a guest bus address mapped to a guest physical address) by a virtual input-output memory management unit. For example, a guest bus address is mapped to a guest physical address, by the virtual input-output memory management unit; this same guest bus address may also be translated, by the hypervisor, to a host physical address (e.g., a physical address in physical memory).

To execute a particular access request on behalf of the guest virtual machine, the hypervisor typically translates a guest bus address to a host physical address, and then accesses the request through the host physical address. However, the above discussed translation adds significant overhead on the part of the hypervisor, especially for applications involving network function virtualization, which may deal with a large amount of access requests involving a small amount of processing resources for each access request. For example, a great deal of requests to transmit and/or receive packets of information may be received (e.g., at speeds above 10 GB/s), where each request provides minimal information; so, reducing overhead caused by guest bus address translation via hypervisor (e.g., bypassing hypervisor translation) may provide a significant advantage. Furthermore, as previously noted, guest bus addresses may be mapped to guest physical addresses by the virtual input-output memory management unit. Translation of these mappings (e.g., determining the guest bus address for a respective guest physical address), likewise, is a source of computing inefficiency.

By reserving a physical bus address range, the system may be configured for hypervisor translation bypass. More particularly, the hypervisor may configure the host input-output memory management unit to translate addresses and handle device access requests, for example, so the hypervisor does not have to translate addresses and handle device access requests. By bypassing hypervisor translation, the hypervisor has additional processing resources to execute more requests on behalf of guest virtual machines. Additionally, because bypassing translation provides for increased computing performance, for example, the hypervisor has additional processing resources to allow more guest virtual machines to execute on a given host without negatively affecting performance. The present disclosure describes advantageous systems and methods for hypervisor translation bypass to reduce overhead and increase efficiency, for example, providing particularly large increases in efficiency for network function virtualization applications.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example, a hardware device (e.g., device 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors (e.g., CPU 120A-C) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. Also, as discussed herein, input/output device 140A-B refers to a device capable of providing an interface between one or more processors and an external device. The external device's operation is based on the processor inputting and/or outputting data.

Processors 120A-C may be interconnected using a variety of techniques, ranging from a point-to-point processor interconnect to a system area network, such as an Ethernet-based network. Local connections within each node 110A-D, including the connections between a processor 120A and a memory device 130A-B, between a processor 120A and an input/output device 140A, etc., may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device 150A-B.

Computer system 100 may run at least one guest virtual machine (e.g., VM 170A), by executing a software layer (e.g., hypervisor 180) above the hardware and below the guest virtual machine 170A, as schematically shown in FIG. 1. In an example, the hypervisor 180 may be a component of the host operating system 186 executed by the computer system 100. In another example, the hypervisor 180 may be provided by an application running on the host operating system 186. In another example, the hypervisor 180 may run directly on the computer system 100 without an operating system beneath it. For example, the hypervisor 180 may run directly on computer system 100, without host operating system 186 or host memory 184. The hypervisor 180 may virtualize the physical layer, including processors, memory, and input/output devices, and present this virtualization to the guest virtual machine 170A as devices, including a virtual processor (e.g., VCPU 190A), virtual memory device (e.g., VMD 192A), and/or virtual I/O device (e.g., VI/O 194A), also referred generally to as virtual devices. The hypervisor 180 may additionally virtualize a virtual input-output memory management unit (e.g., VIOMMU 191A).

A guest virtual machine 170A may run on any type of dependent, independent, compatible, and/or incompatible applications on the underlying hardware and OS 186. In an example, applications (e.g., App 198A-B) run on guest virtual machine 170A may be dependent on the underlying hardware and/or OS 186. In another example, applications 198A-B run on guest virtual machine 170A may be independent of the underlying hardware and/or OS 186. For example, applications 198A-B run on guest virtual machine 170A may be dependent on the underlying hardware and/or OS 186 while other applications (e.g., App 198C-D) run on a second guest virtual machine 170B are independent of the underlying hardware and/or OS 186. Additionally, applications 198A-B run on the guest virtual machine 170A may be compatible with the underlying hardware and/or OS 186. In an example, applications 198A-B run on the guest virtual machine 170A may be incompatible with the underlying hardware and/or OS 186. For example, applications 198A-B run on the guest virtual machine 170A may be compatible with the underlying hardware and/or OS 186 while other applications (e.g., App 198C-D) run on the second guest virtual machine 170B are incompatible with the underlying hardware and/or OS 186. In an example, a device may be implemented as a guest virtual machine 170A.

In an example, guest virtual machine 170A may execute guest operating system (guest OS) 196A, which may utilize the underlying VCPU 190A, VMD 192A, VI/O device 194, and VIOMMU 191A. One or more applications 198A-B may be running on guest virtual machine 170A under the guest operating system 196A. In an example, guest virtual machine 170A may include multiple virtual processors. Processor virtualization may be implemented by the hypervisor 180 scheduling time slots on one or more physical processors 120A-C such that, from the guest operating system's perspective, those time slots are scheduled on a virtual processor 190A.

Typically, the hypervisor 180 controls and limits access to memory (e.g., memory allocated to the guest virtual machine 170A), which may be allocated to an operating system (e.g., the guest operating system 196A of the guest virtual machine 170A). In an example, guest memory 195A may be divided into a plurality of memory pages (e.g., guest bus addresses). Access to these memory pages is controlled and limited by the hypervisor 180. For example, mappings to memory may be managed by the hypervisor 180, a host input-output memory management unit (IOMMU) 188, and the VIOMMU 191A. In an example, mappings related to guest memory 195A (e.g., guest bus addresses mapped to guest physical addresses) may be stored in VIOMMU 191A. In a different example, mappings related to guest memory 195A and host memory 184 (e.g., guest bus addresses mapped to host physical addresses) may be stored in the host IOMMU 188.

Additionally, through these mappings, the memory itself can be accessed. For example, guest memory 195A allocated to the guest operating system 196A is mapped from host memory 184 such that when a guest application 198A-B or a device (e.g., VI/O device 194, hardware device 150A-B, etc.) uses or accesses a memory page of guest memory 195A it is actually using or accessing host memory 184. Host memory 184 may also be referred to as host physical memory 184, as host physical memory 184 physically exists on hardware of a computer system (e.g., system 100). For example, the hypervisor 180 may translate guest bus addresses to host physical addresses by using mappings stored in the host IOMMU 188. Likewise, mappings may be used together with any paging data structure used by the guest virtual machine 170A to support translation from guest OS 196A to host OS 186 addresses (e.g., 32-bit linear address space using a two-level hierarchical paging structure, Physical Address Extension mode, INTEL® Extended Memory 64 Technology mode, etc.).

FIGS. 2A-C are block diagrams illustrating an example of using a physical bus address range for translation bypass according to an example of the present disclosure.

FIG. 2A illustrates a first memory configuration 201. In the first memory configuration 201, an allowed address range of the physical bus address range has not yet been reserved by the hypervisor. For example, physical bus address range 205 is a range of physical bus addresses, mapped to host physical addresses. The mappings associated with this physical bus address range 205 (e.g., guest bus addresses mapped to host physical addresses) are stored in the host IOMMU 188.

FIG. 2B illustrates a second memory configuration 202. In the second memory configuration 202, an allowed address range of the physical bus address range has been reserved by the hypervisor. For example, the hypervisor 180 has reserved the allowed address range 210 from the physical bus address range 205. For example, the allowed address range 210 is a range of guest bus addresses, mapped to guest physical addresses. The mappings associated with this allowed address range 210 (e.g., guest bus addresses mapped to guest physical addresses) are stored in the VIOMMU 191A. In an example, the allowed address range 210 is a strict subset of the physical bus address range 205 (e.g., one-half). For example, the VIOMMU mapped allowed address range is one-half of the host IOMMU mapped physical bus address range.

The physical bus address range 205 may further include a device request buffer 215 to handle access requests (e.g., access request 220) from guest virtual machine 170A for devices (e.g., CPU 120A-C, MD 130A-C, I/O 140A-B, a software device, and/or hardware device 150A-B). Storing the device request buffer 215 in the physical bus address range 205, and outside of the allowed address range 210 may provide, for example, better security associated with access requests received from guest virtual machine 170A. For example, the device request buffer 215 may preferably be stored in the host IOMMU mapped physical bus address range, but outside of the VIOMMU mapped allowed address range.

FIG. 2C illustrates a third memory configuration 203. In the third memory configuration 203, an access request 220 (e.g., from guest virtual machine 170A) is stored outside the allowed address range 210, but within the physical bus address range 205. For example, access request 220 is stored in the device request buffer 215, which is stored in the host IOMMU mapped physical bus address range, but outside of the VIOMMU mapped allowed address range. In an example, access request 220 is stored in the device request buffer 215 without any modification, for example, to improve security associated with access requests. Advantageously, storing access request 220 outside of the allowed address range 210 exposes devices to additional memory (e.g., memory mapped to physical bus address range 205 that is outside of allowed address range 210).

In an example, reserving the allowed address range 210 from the physical bus address range 205 limits the range of guest bus addresses mapped to guest physical addresses. This ensures that only mappings associated with the allowed address range 210 (e.g., guest bus addresses mapped to guest physical addresses) are stored in the VIOMMU 191A. Likewise, the reserved range (e.g., the allowed address range 210) may protect the guest virtual machine 170A and VIOMMU 191A from devices (e.g., CPU 120A-C, MD 130A-C, I/O 140A-B, a software device, and/or hardware device 150A-B). For example, physical bus addresses outside of the allowed address range 210 are accessible by devices. By storing the access request 220 outside of the allowed address range 210, devices (e.g., CPU 120A-C, MD 130A-C, I/O 140A-B, a software device, and/or hardware device 150A-B) may access the access request 220, but may not access the allowed address range 210, thus protecting the guest virtual machine 170A and VIOMMU 191A from malicious device access.

Figure 3:
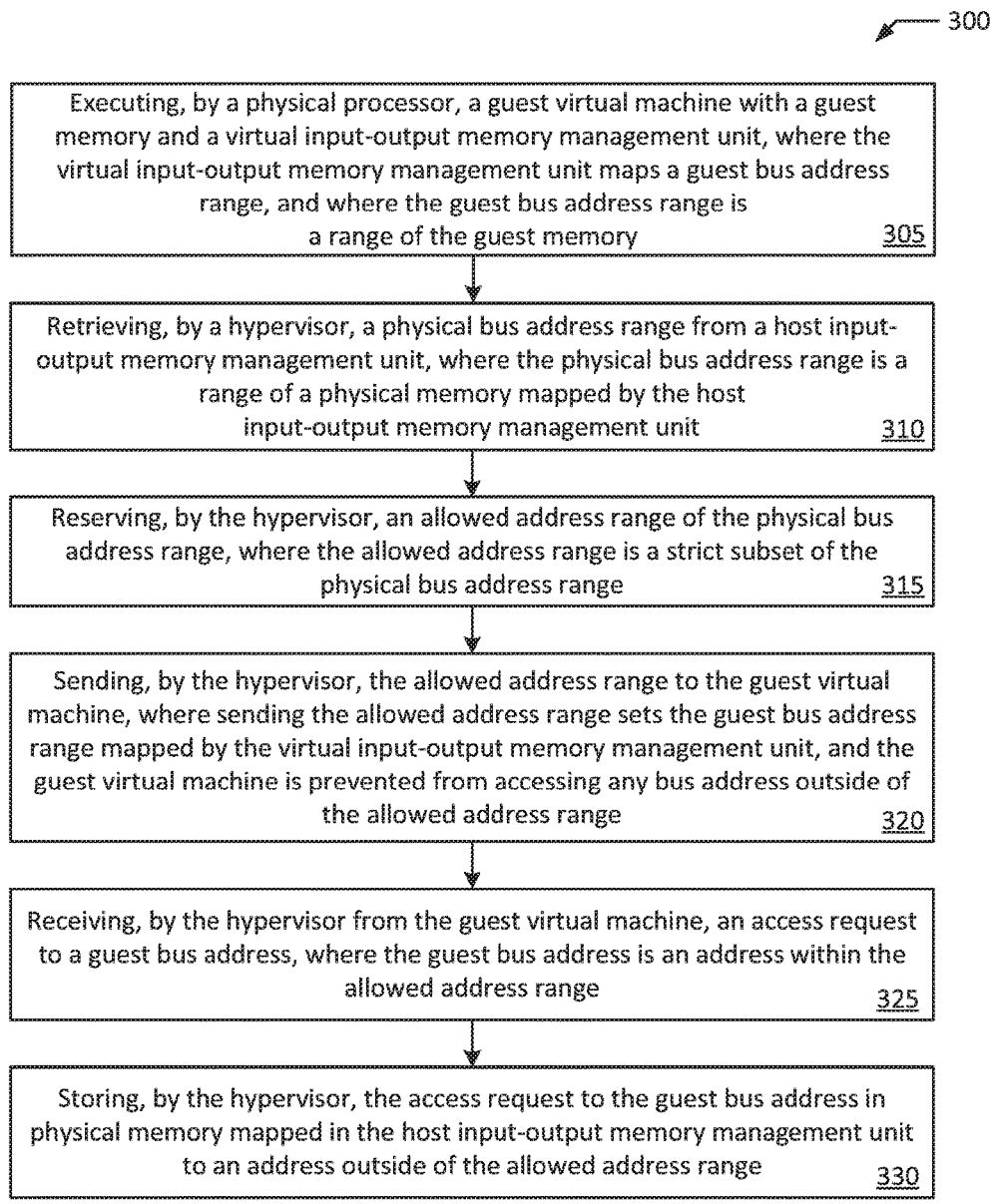
FIG. 3 is a flowchart illustrating an example method of translation bypass according to an example of the present disclosure.

FIG. 3 is a flowchart illustrating an example method of translation bypass according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described may be optional. The method 300 may be performed by processing logic that may include hardware (circuitry, dedicated logic, etc.), software, or a combination of both. For example, the method 300 may be performed by hypervisor 180 interacting with guest virtual machine 170A, host IOMMU 188, and device 150A.

The example method 300 starts with executing, by a physical processor, a guest virtual machine with a guest memory and a virtual input-output memory management unit, where the virtual input-output memory management unit maps a guest bus address range, and where the guest bus address range is a range of the guest memory (block 305). For example, physical processor 120A executes guest virtual machine 170A with guest memory 195A and VIOMMU 191A. The VIOMMU 191A maps a guest bus address range, which is a range of guest memory 195A (e.g., guest bus addresses mapped to guest physical addresses). For example, the guest bus address range may be a 38-bit address range of guest bus addresses.

A hypervisor retrieves a physical bus address range from a host input-output memory management unit, where the physical bus address range is a range of physical memory mapped by the host input-output memory management unit (block 310). For example, hypervisor 180 retrieves from the host IOMMU 188, the physical bus address range 205. In an example, the physical bus address range 205 is a range of a physical memory (e.g., host memory 184) mapped by the host IOMMU 188 (e.g., guest bus addresses mapped to host physical addresses). For example, the physical bus address range may be a 39-bit address range.

The hypervisor reserves an allowed address range of the physical bus address range, where the allowed address range is a strict subset of the physical bus address range (block 315). For example, hypervisor 180 reserves the allowed address range 210 from the physical bus address range 205. In an example, the allowed address range 210 is a strict subset of the physical bus address range 205. For example, the strict subset may be one-half, such that the allowed address range (e.g., the 38-bit address range) is one-half the physical bus address range (e.g., the 39-bit address range). In alternate examples, the strict subset may be one-third, one-fourth, one-eighth, etc.

The hypervisor sends the allowed address range to the guest virtual machine, where sending the allowed address range sets the guest bus address range mapped by the virtual input-output memory management unit, and the guest virtual machine is prevented from accessing any bus address outside of the allowed address range (block 320). For example, hypervisor 180 sends the allowed address range 210 to guest virtual machine 170A. In an example, sending the allowed address range 210 sets the guest bus address range mapped by the VIOMMU 191A (e.g., guest bus addresses mapped to guest physical addresses), and the guest virtual machine 170A is prevented from accessing any bus address outside of the allowed address range 210. For example, access to addresses within the 39-bit address range, but outside the 38-bit address range is prevented.

The hypervisor then receives, from the guest virtual machine, an access request to a guest bus address, where the guest bus address is an address within the allowed address range (block 325). For example, hypervisor 180 receives, from guest virtual machine 170A, access request 220 to the guest bus address. In an example, the guest bus address is an address within the allowed address range 210 (e.g., the 38-bit address range).

The example method 300 finally includes storing, by the hypervisor, the access request to the guest bus address in physical memory mapped in the host input-output memory management unit to an address outside of the allowed address range (block 330). For example, hypervisor 180 stores access request 220 to the guest bus address in physical memory (e.g., host memory 184) mapped in host IOMMU 188 to an address outside of the allowed address range 210. For example, the access request 220 is stored at a location within the 39-bit address range, but outside the 38-bit address range.

Figure 4A:
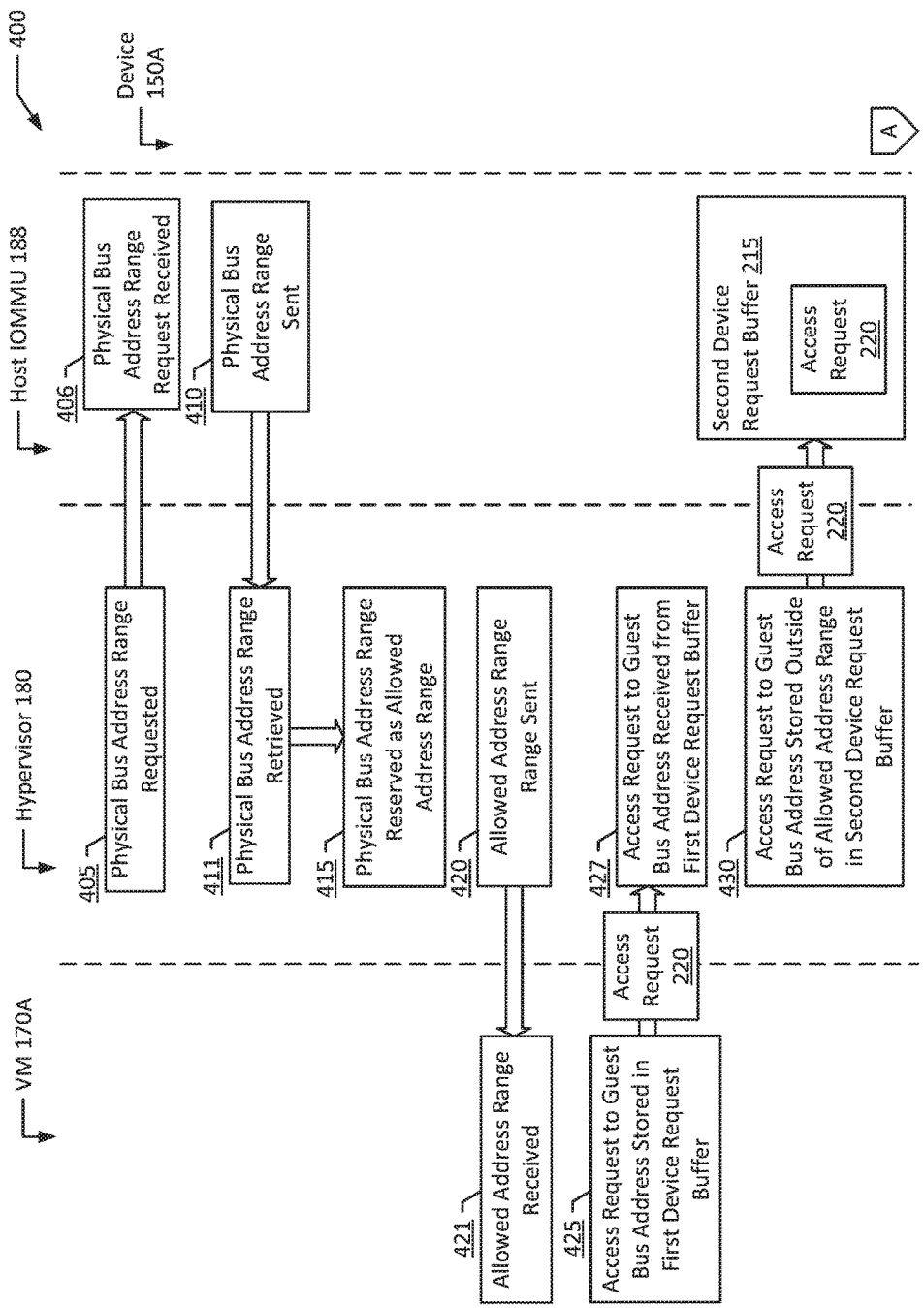
FIGS. 4A-B are flow diagrams illustrating translation bypass according to an example of the present disclosure.
Figure 4B:
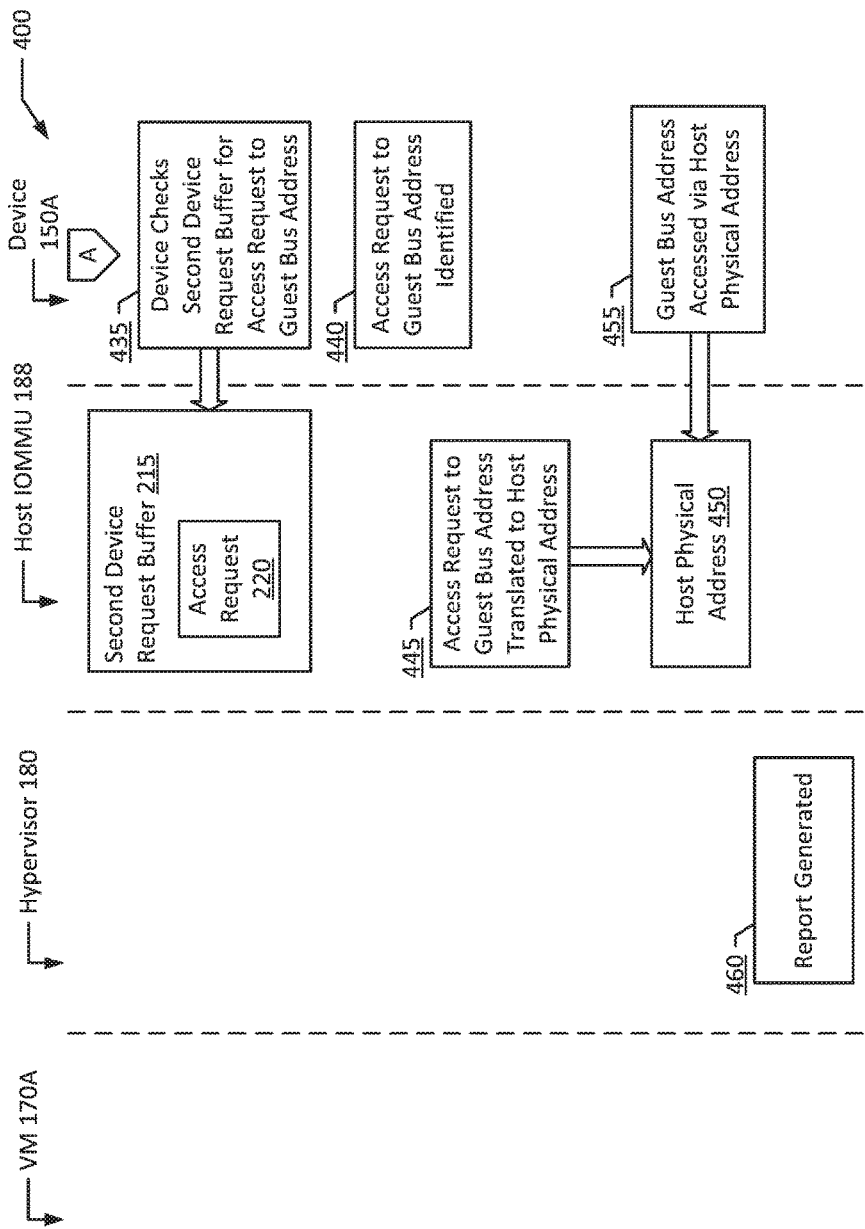

FIGS. 4A-B are flow diagrams illustrating translation bypass according to an example of the present disclosure. Although the example method 400 is described with reference to the flow diagram illustrated in FIGS. 4A-B, it will be appreciated that many other methods of performing the acts associated with the method may be used. For example, the order of some of the blocks may be changed, certain blocks may be combined with other blocks, and some of the blocks described may be optional. The method 400 may be performed by processing logic that may include hardware (circuitry, dedicated logic, etc.), software, or a combination of both. For example, the method 400 may be performed by hypervisor 180 interacting with virtual machine 170A, host IOMMU 188, and device 150A. In an example, the guest virtual machine 170A is executing on a physical processor (e.g., CPU 120A). Likewise, in an example, the guest virtual machine 170A has a guest memory 195A and a VIOMMU 191A. The VIOMMU 191A maps a guest bus address range, which is a range of the guest memory 195A.

In the illustrated example in FIG. 4A, the hypervisor 180 requests the physical bus address range 205 from the host IOMMU 188 (blocks 405 and 406). For example, the hypervisor 180 sends a request to the host IOMMU 188; the host IOMMU 188 receives the request from the hypervisor 180. The hypervisor 180 retrieves the physical bus address range 205 from the host IOMMU 188 (blocks 410 and 411). For example, the host IOMMU 188 sends the host IOMMU mapped physical bus address range to the hypervisor 180; the hypervisor 180 receives the host IOMMU mapped physical bus address range. In an example, the physical bus address range 205 is a range of physical memory mapped by the host IOMMU 188 (e.g. guest bus addresses mapped to host physical addresses).

The hypervisor 180 reserves an allowed address range 210 of the physical bus address range 205 (block 415). For example, the hypervisor 180 reserves the VIOMMU mapped allowed address range of the host IOMMU mapped physical bus address range. In an example, the allowed address range 210 (e.g., the 38-bit address range) is a strict subset of the physical bus address range 205 (e.g., the 39-bit address range). For example, the strict subset may be one-half, such that the allowed address range 210 is one-half the physical bus address range 205. In a different example, the strict subset is one-quarter, such that the allowed address range 210 is one-quarter the physical bus address range 205.

In an example, reserving the allowed address range 210 includes setting a quantity of bits for the allowed address range 210. For example, the hypervisor 180 may set the quantity of bits for the allowed address range 210 so that it is one-half of the physical bus address range 205. In an example, the quantity of bits is set with a hardware width addressable. In a related example, by reserving the allowed address range 210, any guest bus address may be mapped to a host physical address by the host IOMMU 188; by comparison, only guest bus addresses within the allowed address range 210 may be mapped to guest physical addresses by the VIOMMU 191A. For example, the host IOMMU 188 may access any guest bus address in the physical bus address range 205; by comparison, the VIOMMU 191A may access any guest bus address in the allowed address range 210, which is a strict subset of the physical bus address range 205. In this example, the VIOMMU 191A is restricted from accessing guest bus addresses outside the allowed address range 210 (e.g., a guest bus address having higher bits).

The hypervisor 180 sends the allowed address range 210 to the guest virtual machine 170A, such that the allowed address range 210 is received by the guest virtual machine 170A (blocks 420 and 421). In an example, sending the allowed address range 210 sets the guest bus address range mapped by the VIOMMU 191A. For example, only guest bus addresses within the allowed address range 210 are mapped to guest physical addresses by the VIOMMU 191A. Likewise, in an example, the guest virtual machine 170A is prevented from accessing any bus address outside of the allowed address range 210.

The hypervisor 180 receives, from the guest virtual machine 170A, an access request 220 to a guest bus address (blocks 425 and 427). In an example, the guest bus address is an address within the allowed address range 210. For example, the guest virtual machine 170A stores access request 220 to the guest bus address in a first device request buffer (e.g., a device request buffer within the allowed address range 210). Likewise, for example, the access request 220 to the guest bus address is received, by the hypervisor 180, from the first device request buffer (e.g., the hypervisor 180 retrieves the access request 220 from the first device request buffer in the allowed address range 210).

The hypervisor 180 stores the access request 220 to the guest bus address in physical memory mapped in the host IOMMU 188 to an address outside of the allowed address range 210 (block 430). In an example, the hypervisor 180 stores the access request 220 in a device request buffer (e.g., second device request buffer 215) located in physical memory mapped in the host IOMMU 188 to an address that is outside of the allowed address range 210. For example, second device request buffer 215 may be located in the physical bus address range 205, but outside the allowed address range 210.

Continuing on to FIG. 4B, the device 150A is configured to access the guest bus address in physical memory mapped in the host IOMMU 188 to the address outside of the allowed address range 210. More particularly, the device 150A checks the second device request buffer 215 for the access request 220 to the guest bus address (block 435). The access request 220 to the guest bus address is identified (block 440). For example, the hypervisor 180 is bypassed and does not receive any access request from the device 150A. In an example, the device 150A is a hardware device. In alternate examples, the device 150A may be any of CPU 120A-C, MD 130A-C, I/O 140A-B, a software device, a hardware device 150A-B, etc.

The host IOMMU 188 is configured to translate the access request 220 (e.g., the access request to the guest bus address) (block 445). For example, the host IOMMU 188 translates the guest bus address, associated with the access request 220, to a host physical address 450 (e.g., the physical address that matches the guest bus address). In a related example, the access request 220 for the guest bus address is associated with a guest physical address. In this example, prior to host IOMMU 188 translation of the guest bus address to the host physical address 450, the VIOMMU 191A translates the guest physical address to the guest bus address.

The device 150A accesses the guest bus address via the host physical address 450 (block 455). In an example, because the guest bus address is translated to a host physical address 450, by accessing the guest bus address, the device 150A accesses the host physical address 450 (e.g., an address in host memory 184). In an example, the hypervisor 180 is bypassed and does not translate the guest bus address into the host physical address 450; rather, translation is performed by the host IOMMU 188.

In an example, responsive to the device 150A accessing the guest bus address, a report is generated (block 460). For example, responsive to hypervisor 180 detecting that the device 150A has accessed the guest bus address in physical memory mapped in the host IOMMU 188 to an address outside of the allowed address range 210, the hypervisor 180 generates a report. In an example, the report indicates that the access request 220 has been executed.

Figure 5:
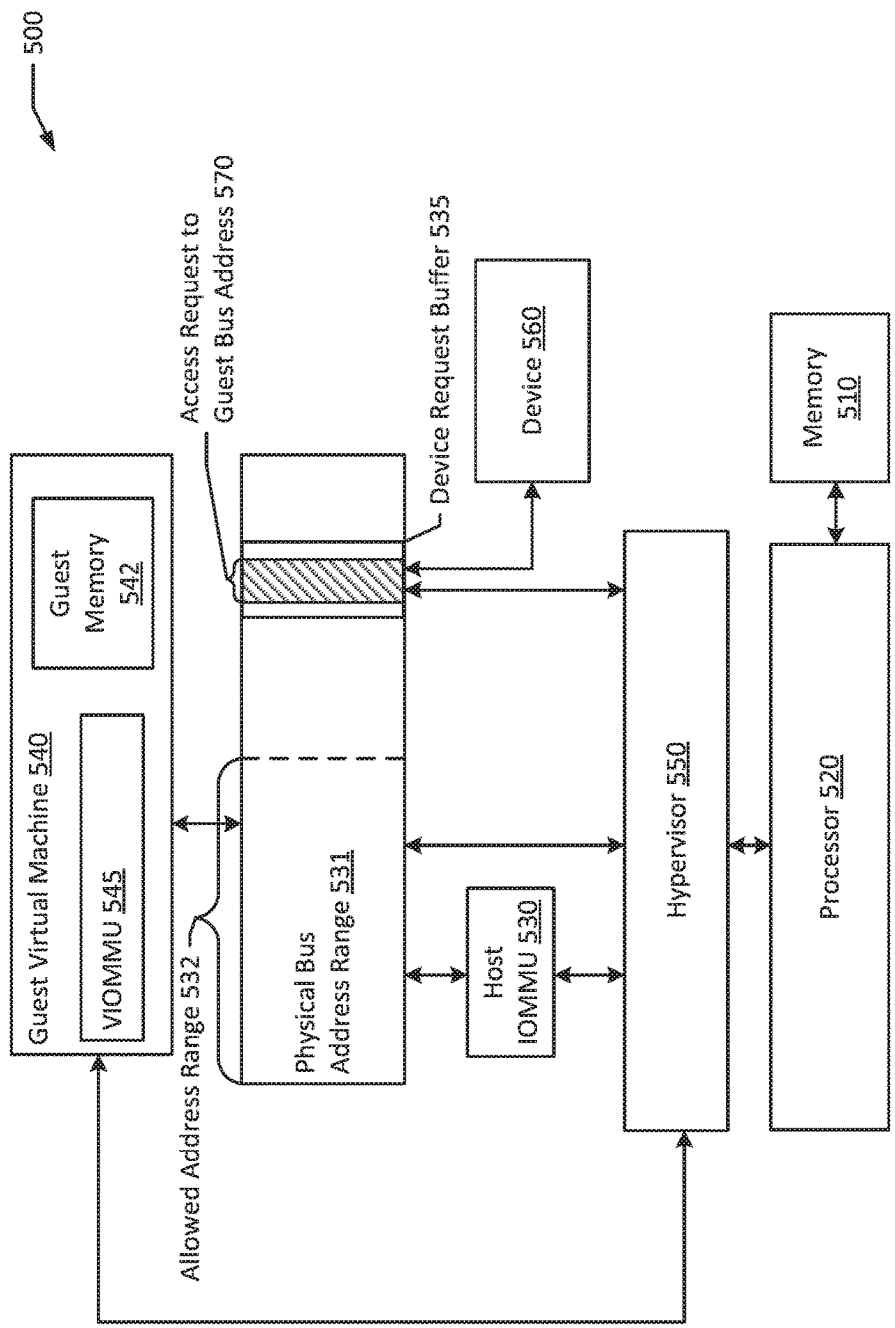
FIG. 5 is a block diagram of an example computer system according to an example of the present disclosure.

FIG. 5 is a block diagram of an example computer system 500 according to an example of the present disclosure. The computer system 500 may include a memory 510 (e.g., physical memory) and a processor 520 in communication with the memory 510. The computer system 500 may further include a host input-output memory management unit (host IOMMU) 530 executing on the processor 520. The computer system 500 may further include a guest virtual machine 540 executing on the processor 520. The guest virtual machine 540 may include a guest memory 542 and a virtual input-output memory management unit (VIOMMU) 545. The VIOMMU 545 maps a guest bus address range, which is a range of guest memory 542. The computer system 500 may also include a hypervisor 550 executing on the processor 520. The computer system 500 may further include a device 560.

The hypervisor 550 retrieves a physical bus address range 531 from the host IOMMU 530. The physical bus address range 531 is a range of the physical memory 510 mapped by the host IOMMU 530. In an example, the physical bus address range 531 is referred to as a host IOMMU mapped physical bus address range. The hypervisor 550 reserves an allowed address range 532 of the physical bus address range 531. The allowed address range 532 is a strict subset of the physical bus address range 531. In an example, the allowed address range 532 is referred to as a VIOMMU mapped allowed address range. In an example, reserving the allowed address range 532 includes setting a quantity of bits for the allowed address range 532. In an example, by reserving the allowed address range 532, any guest bus address is accessible by the host IOMMU 530 and only guest bus addresses within the allowed address range 532 are accessible by the VIOMMU 545.

The hypervisor 550 sends the allowed address range 532 to the guest virtual machine 540. In an example, sending the allowed address range 532 sets the guest bus address range mapped by the VIOMMU 545. For example, the guest virtual machine 540 is prevented from accessing any bus address outside of the allowed address range 532. The hypervisor 550 receives, from the guest virtual machine 540, an access request to guest bus address 570. The guest bus address is an address within the allowed address range 532. The hypervisor 550 stores the access request to guest bus address 570 in physical memory 510 mapped in the host IOMMU 530 to an address outside of the allowed address range 532. For example, the access request to guest bus address 570 is mapped to a bus address within the physical bus address range 531, but outside of the allowed address range 532. In an example, the hypervisor 550 stores the access request to guest bus address 570 in a device request buffer 535. For example, the access request to guest bus address 570 may be stored in device request buffer 535 located in the physical bus address range 531, but outside of the allowed address range 532.

In an example, the device 560 is configured to access the guest bus address (e.g., via the access request to guest bus address 570) in memory 510 mapped in the host IOMMU 530 to an address outside of the allowed address range 532. In a related example, the host IOMMU 530 is configured to translate the access request to guest bus address 570 to a host physical address. For example, the host physical address corresponds to guest memory 542 programmed to match the guest bus address in the VIOMMU 545. In this example, by accessing the guest bus address (e.g., via the access request to guest bus address 570), the device 560 is actually accessing the host physical address corresponding to guest memory 542 that matches the guest bus address in the VIOMMU 545. Likewise, in this example, any translation by the hypervisor 550 (e.g., translation from guest bus address to host physical address) is bypassed. Accordingly, example computer system 500 may advantageously reduce overhead and increase efficiency, particularly, for example, in network function virtualization applications.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures. It should also be noted that a hypervisor may be referred to differently in various systems, for example, as a virtual machine monitor. Any program or component performing steps of the hypervisor as described herein may be a hypervisor in accordance with the present disclosure.

It should be understood that various changes and modifications to the examples described herein are apparent. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   executing, by a physical processor, a guest virtual machine with a guest memory and a virtual input-output memory management unit, wherein the virtual input-output memory management unit maps a guest bus address range, and wherein the guest bus address range is a range of the guest memory;
   retrieving, by a hypervisor, a physical bus address range from a host input-output memory management unit, wherein the physical bus address range is a range of a physical memory mapped by the host input-output memory management unit;
   reserving, by the hypervisor, an allowed address range of the physical bus address range, wherein the allowed address range is a strict subset of the physical bus address range;
   sending, by the hypervisor, the allowed address range to the guest virtual machine, wherein sending the allowed address range sets the guest bus address range mapped by the virtual input-output memory management unit, and the guest virtual machine is prevented from accessing any bus address outside of the allowed address range;
   receiving, by the hypervisor from the guest virtual machine, an access request to a guest bus address, wherein the guest bus address is an address within the allowed address range; and
   storing, by the hypervisor, the access request to the guest bus address in physical memory mapped in the host input-output memory management unit to an address outside of the allowed address range.

2. The method of claim 1, wherein reserving the allowed address range includes setting a quantity of bits for the allowed address range.

3. The method of claim 2, wherein by reserving the allowed address range, any guest bus address is accessible by the host input-output memory management unit and only guest bus addresses within the allowed address range are accessible by the virtual input-output memory management unit.

4. The method of claim 1, further comprising configuring the device to access the guest bus address in physical memory mapped in the host input-output memory management unit to the address outside of the allowed address range.

5. The method of claim 4, further comprising configuring the host input-output memory management unit to translate the access request to the guest bus address to a host physical address that corresponds to guest memory programmed to match the guest bus address in the virtual input-output memory management unit.

6. The method of claim 4, wherein, responsive to detecting access by the device to the guest bus address in physical memory mapped in the host input-output memory management unit to the address outside of the allowed address range, the hypervisor generates a report indicating that the request has been executed.

7. The method of claim 1, wherein the access request to the guest bus address is stored in a device request buffer located in physical memory mapped in the host input-output memory management unit to the address outside of the allowed address range.

8. The method of claim 1, wherein the strict subset is one-half, such that the allowed address range is one-half the physical bus address range.

9. The method of claim 1, wherein the physical bus address range is the complete range of the physical memory mapped by the host input-output memory management unit.

10. A system comprising:
    a physical memory;
    one or more processors, in communication with the physical memory;
    a host input-output memory management unit, executing on the one or more processors;
    a guest virtual machine, executing on the one or more processors, the guest virtual machine including a guest memory and a virtual input-output memory management unit, wherein the virtual input-output memory management unit maps a guest bus address range, wherein the guest bus address range is a range of the guest memory;
    a device; and
    a hypervisor, executing on the one or more processors, wherein the hypervisor:
      retrieves a physical bus address range from the host input-output memory management unit, wherein the physical bus address range is a range of the physical memory mapped by the host input-output memory management unit;
      reserves an allowed address range of the physical bus address range, wherein the allowed address range is a strict subset of the physical bus address range;
      sends the allowed address range to the guest virtual machine, wherein sending the allowed address range sets the guest bus address range mapped by the virtual input-output memory management unit, and the guest virtual machine is prevented from accessing any bus address outside of the allowed address range;
      receives, from the guest virtual machine, an access request to a guest bus address, wherein the guest bus address is an address within the allowed address range; and
      stores the access request to the guest bus address in physical memory mapped in the host input-output memory management unit to an address outside of the allowed address range.

11. The system of claim 10, wherein reserving the allowed address range includes setting a quantity of bits for the allowed address range.

12. The system of claim 11, wherein by reserving the allowed address range, any guest bus address is accessible by the host input-output memory management unit and only guest bus addresses within the allowed address range are accessible by the virtual input-output memory management unit.

13. The system of claim 10, wherein the device is configured to access the guest bus address in physical memory mapped in the host input-output memory management unit to the address outside of the allowed address range.

14. The system of claim 13, wherein the host input-output memory management unit is configured to translate the access request to the guest bus address to a host physical address that corresponds to guest memory programmed to match the guest bus address in the virtual input-output memory management unit.

15. The system of claim 10, wherein the access request to the guest bus address is stored in a device request buffer located in physical memory mapped in the host input-output memory management unit to the address outside of the allowed address range.

16. A computer-readable non-transitory storage medium comprising executable instructions that, when executed, cause a hypervisor to:
retrieve a physical bus address range from a host input-output memory management unit, wherein the physical bus address range is a range of a physical memory mapped by the host input-output memory management unit;
reserve an allowed address range of the physical bus address range, wherein the allowed address range is a strict subset of the physical bus address range;
send the allowed address range to a guest virtual machine, the guest virtual machine including a guest memory and a virtual input-output memory management unit, wherein the virtual input-output memory management unit maps a guest bus address range, wherein the guest bus address range is a range of the guest memory, and wherein sending the allowed address range sets the guest bus address range mapped by the virtual input-output memory management unit, and the guest virtual machine is prevented from accessing any bus address outside of the allowed address range;
receive, from the guest virtual machine, an access request to a guest bus address, wherein the guest bus address is an address within the allowed address range; and
store the access request to the guest bus address in physical memory mapped in the host input-output memory management unit to an address outside of the allowed address range.

17. The computer-readable non-transitory storage medium of claim 16, wherein reserving the allowed address range includes setting a quantity of bits for the allowed address range.

18. The computer-readable non-transitory storage medium of claim 17, wherein by reserving the allowed address range, any guest bus address is accessible by the host input-output memory management unit and only guest bus addresses within the allowed address range are accessible by the virtual input-output memory management unit.

19. The computer-readable non-transitory storage medium of claim 16, wherein a device accesses the guest bus address in physical memory mapped in the host input-output memory management unit to the address outside of the allowed address range.

20. The computer-readable non-transitory storage medium of claim 16, wherein the access request to the guest bus address is stored in a device request buffer located in physical memory mapped in the host input-output memory management unit to the address outside of the allowed address range.

* * * * *